United States Patent Office 3,618,238
Patented Nov. 9, 1971

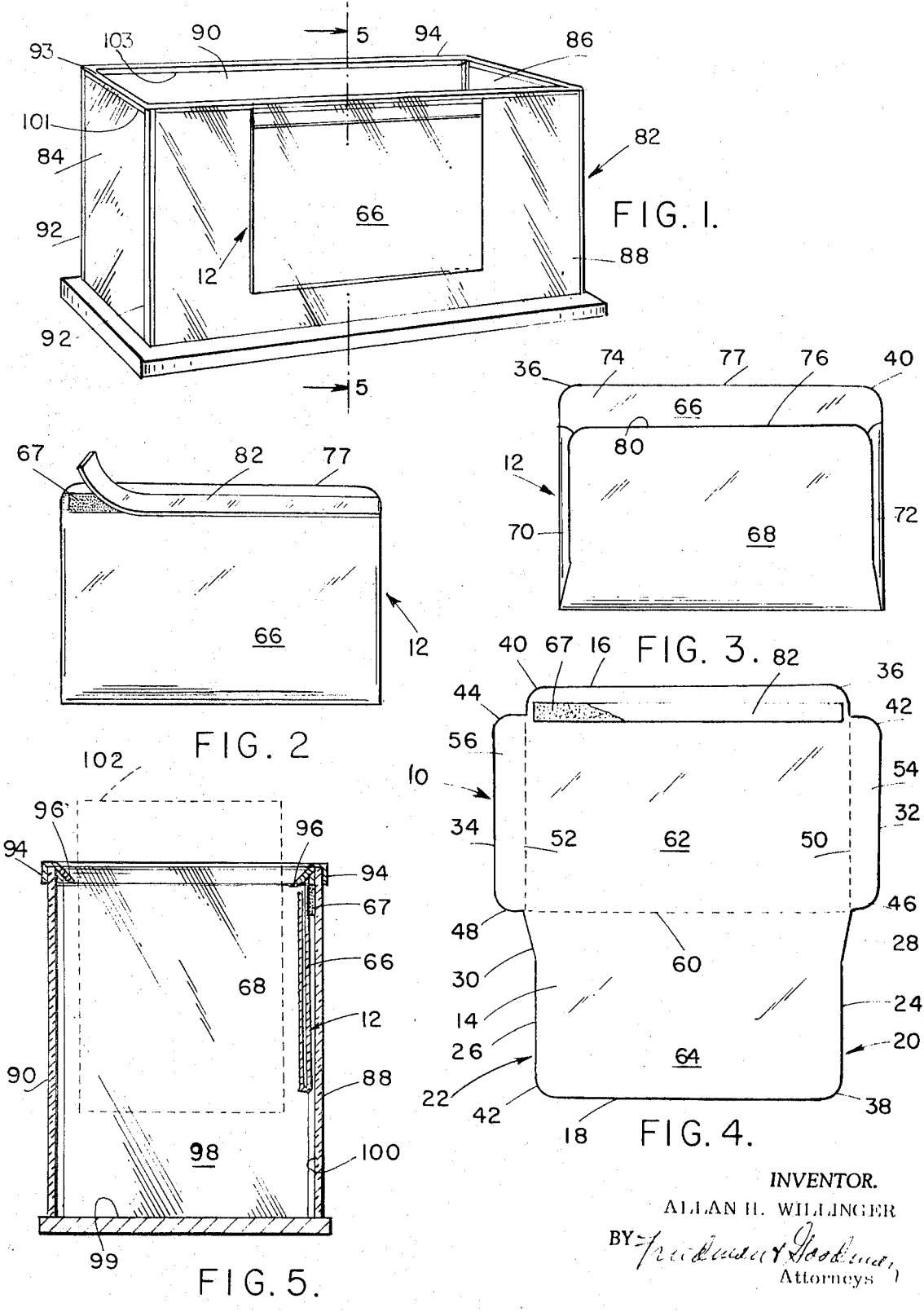

3,618,238
AQUARIUM TANK DISPLAY HOLDER
Allan H. Willinger, New Rochelle, N.Y., assignor to
Metaframe Corporation, Hawthorne, Calif.
Filed Aug. 19, 1969, Ser. No. 851,380
Int. Cl. G09f *3/18*
U.S. Cl. 40—10 R                    7 Claims

ABSTRACT OF THE DISCLOSURE

An aquarium tank having a pair of parallel opposing transparent end walls and a pair of parallel opssing transparent side walls, and a bottom wall, in combination with a wrapper adapted to be removably mountable to the inside surface of one of the walls and being visible therethrough, said wrapper formed of a blank foldable to define an open envelope having opposing front and rear sides joined by interconnecting end flaps contiguous with and defined from said front side, a stripe of adhesive provided on the face of said front side to removably mount the wrapper to an aquarium wall.

BACKGROUND OF THE INVENTION

(1) Field of the invention

This invention relates generally to the aquarium art and more specifically, to an aquarium tank in combination with a removably affixable wrapper which wrapper simultaneously serves to bear suitable aquarium advertising and to contain therein other and related aquarium information.

(2) Description of the prior art

Of course there are many forms of labels now employed for bearing aquarium advertising information. Most usually employed is the type of label which is glued on to the article desired to be advertised or sold, and which label must be scraped off when the tank is ready for use. Alternatively, instead of employing a paste on label, a separate display card has been provided which is either leaned on the tank or is provided with a suitable base so that it will stand of its own accord. Moreover, if any informational material is to be provided with the aquarium tank, such as booklets on the care and feeding of fish, these are usually provided under separate cover.

It would, therefore, be of distinct advantage if a means could be found which would act simultaneously to bear aquarium advertising and to hold various information materials, which means could be removably mounted to an aquarium tank.

SUMMARY

It is, therefore, among one of the principal objectives of this invention to provide such means for simultaneously bearing aquarium advertising and for holding aquarium informational material.

In accordance with the present invention, there is provided an aquarium tank having a pair of parallel opposing transparent end walls and a pair of parallel opposing transparent side walls, and a bottom wall, in combination with a wrapper adapted to be removably mountable to the inside surface of one of said walls and being visible therethrough, said wrapper formed of a blank foldable to define an open envelope having opposing front and rear sides joined by interconnecting end flaps contiguous with and defined from said front side, a stripe of adhesive provided on the face of said front side to removably mount said wrapper to said aquarium wall. Alternatively, the adhesive may be spotted on the face of the front side rather than in a stripe form.

BRIEF DESCRIPTION OF THE DRAWINGS

The invention will be hereinafter more fully described with reference to the accompanying drawings in which:

FIG. 1 is a view in perspective illustrating the inventive wrapper when removably mounted to the inside surface of an aquarium side wall.

FIG. 2 is an elevated view showing the front face of the inventive wrapper and further showing and adhesive stripe applied thereon with a removable covering tap provided over the adhesive stripe.

FIG. 3 is an elevational view similar to FIG. 2 except showing the rear side of the wrapper.

FIG. 4 is a plan view of a blank foldable to define the inventive wrapper shown by FIGS. 2 and 3.

FIG. 5 is a sectional view taken along line 5—5 of FIG. 1 in the direction of the arrows laterally adjacent to the numerals.

DESCRIPTION OF THE SPECIFIC EMBODIMENTS

Referring now to the figures of the drawing in detail, and initially to FIG. 4, there is shown therein a blank 10 foldable to define the inventive wrapper 12.

The blank 10 is formed of a sheet of elongated paper 14 having a pair of parallel opposing transverse edges 16 and 18, and a pair of opposing longitudinal edges 20 and 22. The longitudinal edges 20 and 22 consist of parallel portions 24 and 26, respectively, starting from longitudinal edge 18, opposing outwardly tapered portions 28 and 30, respectively, finally terminating in opposing parallel portions 32 and 34, respectively, which merge into longitudinal edge 16.

All of the resulting corners formed by the confluence of the respective transverse and longitudinal edge portions 16, 18, 20 and 22 are rounded as at 36, 38, 40 and 42 by form rounded corners. Similarly, the corners formed by longitudinal edge portions 32 and 34 at their juncture with tarnsverse edge 16 and tapered portions 28 and 30, of the longitudinal edges 20 and 22, are rounded as at 42, 44, 46 and 48, respectively.

Intermediate the two parallel opposing portions 32 and 34 of the said longitudinal edges are provided a pair of parallel opposing longitudinal fold lines 50 and 52, respectively. Fold lines 50 and 52, in turn, define opposing flap forming members 54 and 56, respectively. A transverse fold line 60 is provided intermediate transverse edges 16 and 18. Thus, the fold lines 50, 52 and 60 define a front side forming member 62 and a rear side forming member 64. It will be seen by referring to the figures and description above, that front side forming member 62 is substantially rectangular shaped while rear side forming member 64, which is bounded by fold line 60, transverse edge 18, edge portions 24 and 26 and outwardly tapered portions 28 and 30 define an elongated Y- shaped pattern. A longitudinal adhesive stripe 67 is applied to the blank 10 at a position close to the transverse edge 16 being located between fold line 60 and edge 16 and being, further, closer to transverse edge 16 than to fold line 60. It is also to be noted that the stripe 67 is inermediae the fold lines 50 and 52 and corners 36 and 40.

In order to form the wrapper 12, what is done is to fold the blank upon itself along fold line 60 thereby forming front side 66 from front side forming member 62 and rear side 64 and rear side 68 from rear side forming member 64. Flap forming members 54 and 56 will fold inwardly in a position intermediate front and rear sides 66 and 68 to form flaps 70 and 72, respectively. A suitable glue or adhesive may be applied to the flaps 70 and 72 in order to interconnect the front and rear sides of the wrapper by adhering the peripheral longitudinal edges of rear side 68 to the same. It will be seen that the resultingly formed wrapper has a portion 74 of the front side 66 which extends upwardly from the terminal peripheral edge 76 of the rear side 68 and an elongated opening 80 is defined thereby giving access into the center of the wrapper. This upwardly extending portion 74 allows for easier access into the wrapper for either placing information therein or removing it therefrom. In order to protect the adhesive stripe before use, a covering tape 82 such as a commercially available waxed transfer tape is applied over the adhesive stripe 67 which protects the stripe from adhering to any other wrappers that may be stacked thereon. The covering tape 82 is readily removable because of its waxy nature from the adhesive stripe when it is desired to removably mount the wrapper to the inside surface of an aquarium wall. On each external face of the front and rear sides of the wrapper, there is provided colorful advertising information depicting various aquarium accessories desired to be advertised and instructions for setting up a new aquarium tank or the like. Additionally, various bits of information such as the care and feeding of fish or accessories for the tank may be placed into the wrapper via its opening 80. The wrapper 12 is employed in combination with an aquarium tank 82 having parallel opposing transparent end walls 84 and 86 and parallel opposing transparent elongated side walls 88 and 90, e.g. glass. The end walls and side walls are joined at their respective vertical edges by conventional means well-known to the art such as by suitable corner supports 92 and are, in turn, joined to a bottom wall 99, also by conventional means. The upper exposed edges 101 and 103, respectively of the end and side walls are provided with protecting metal channel members into which the exposed edges of the aquarium walls are housed. The channel members 93 for the edges 101 are conventional U-shaped channel members, wherein the exposed edges fit into the channels, as are joined thereto by suitable means, such as cementing; however, in accord with another embodiment of the invention, the channel members 94 while being roughly U-shaped, are each provided instead with one of its sides, that is the side inside the tank, being an angularly oriented flange 96 which projects downwardly into the interior 98 of the aquarium tank for a reason that will become apparent subsequently. As before, edges 103 fit inside the channel formed by the member 94.

Describing now the mounting of the wrapper 12 to a wall of the aquarium, what is done is to remove the covering tape 82 from the adhesive stripe 67 and the wrapper is then removably mounted to the inside surface 100 of a side wall 88 or 90 of the tank with the upper edge 77 of the front side 66 directly under the protection of flange 96. It is to be noted that by virtue of the transparency of the aquarium walls that the advertising material on the outer faces of the wrapper is visible from front and back. Moreover, when it is desired to place a similar tank 102 (shown by dotted lines) inside the larger tank 82 by virtue of the wrapper 12 being in a protected position under the flange 96, it is protected from being torn or dislodged from the aquarium wall thereby retaining the effectiveness of the mounted wrapper. Of course, in order to remove the wrapper from the aquarium tank wall, all that need be done is to pull it away from the wall surface thereby breaking the adhesive bond between the wrapper and the wall surface.

Thus there is provided by the invention, an improved combination of an aquarium tank and a wrapper where the wrapper simultaneously acts to bear advertising material and to hold informational material and/or aquarium accessories. Additionally, the upper edges of the aquarium walls are adapted to protect the mounted wrapper within the aquarium tank from accidental dislodgement by the placement of another tank concentrically therein.

What is claimed is:

1. An aquarium tank having a pair of parallel opposing transparent end walls and a pair of parallel opposing transparent side walls and a bottom wall, in combination with a wrapper removably mountable to an inside surface of one tank wall and being visible therethrough, said wrapper defining an open envelope including opposing front and rear sides joined by interconnecting end flaps contiguous with and defined from said front side, upper peripheral edges of said front and rear sides bounding an opening in said envelope, said front side being longer than said rear side to define a front side upper portion extending upwardly from said upper peripheral edge of said rear side, a longitudinally oriented stripe of adhesive provided on said front side upper portion to removably mount said front side of said wrapper adjacent to said inside surface of said one tank wall with said envelope opening being spaced from said inside surface by said front side, said envelope opening facing an interior portion of said aquarium tank, and protective means extending downwardly from a top portion of said one tank wall to overhang said envelope opening for protecting said wrapper, said wrapper being mounted in an underlying relation with said protective means.

2. A combination according to claim 1, wherein a removable covering material is adapted to be applied over said stripe of adhesive before said wrapper is mounted to said inside surface of said one tank wall.

3. A combination according to claim 1, wherein said protective means includes a channel member provided with a pair of side walls and a top wall, one of said channel member side walls being smoothly abutted against an outside surface of said one tank wall, the other channel member side wall being angularly downwardly oriented into the interior portion of said aquarium tank to define a flange overhanging said envelope opening for protecting said wrapper mounted thereunder to said surface of said one tank wall.

4. A combination according to claim 1, wherein said aquarium tank is provided with a pair of said protective means disposed in an opposing relation, each of said protective means being adapted to overhang and protect said wrapper.

5. A combination according to claim 1, wherein advertising material is provided on at least one of said front and rear sides of said envelope.

6. A combination according to claim 1, wherein informational material is provided inside said envelope, said informational material being removable through said opening in said envelope.

7. A combination according to claim 1, wherein said front and rear sides of said envelope are joined by glue disposed between said interconnecting end flaps and confronting peripheral edges of said rear side.

References Cited
UNITED STATES PATENTS

| | | | |
|---|---|---|---|
| 2,014,641 | 9/1935 | Wray | 40—10 A |
| 2,093,598 | 9/1937 | Clark | 40—10 A |
| 2,110,768 | 3/1938 | Kellog | 40—10 |
| 2,203,887 | 6/1940 | Zimmer | 40—159 |
| 2,925,675 | 2/1960 | Lumpkin | 40—16.4 |

ROBERT W. MICHELL, Primary Examiner

W. J. CONTRERAS, Assistant Examiner